United States Patent [19]
Parker

[11] Patent Number: 6,149,703
[45] Date of Patent: Nov. 21, 2000

[54] FUEL SYSTEM FILTERING APPARATUS

[75] Inventor: David Marchant Parker, Oviedo, Fla.

[73] Assignee: Siemens Westinghouse Power Corporation, Orlando, Fla.

[21] Appl. No.: 09/329,985

[22] Filed: Jun. 10, 1999

[51] Int. Cl.[7] .............................. B01D 46/00; B01D 35/30
[52] U.S. Cl. .............................. 55/502; 55/503; 210/435; 210/447; 210/452
[58] Field of Search .............................. 55/502, 503, 504, 55/505, 507, 490; 210/435, 439, 445, 446, 447, 448, 450, 452

[56] References Cited

U.S. PATENT DOCUMENTS

| | | | |
|---|---|---|---|
| 908,308 | 12/1908 | Mueller | 210/447 |
| 1,874,720 | 8/1932 | Wallace | 210/447 |
| 2,557,375 | 6/1951 | Dickenson | 210/447 |
| 2,893,563 | 7/1959 | Bottum . | |
| 2,910,717 | 11/1959 | Raymond . | |
| 2,963,282 | 12/1960 | Jacobitz et al. | 210/452 |
| 3,179,253 | 4/1965 | McNeal . | |
| 3,534,548 | 10/1970 | Connors . | |
| 4,051,042 | 9/1977 | Tullier et al. | 210/447 |
| 4,124,511 | 11/1978 | Lay | 210/447 |
| 4,476,021 | 10/1984 | Souza | 210/335 |
| 4,543,114 | 9/1985 | Beattie et al. | 55/505 |
| 4,582,605 | 4/1986 | Rea et al. | 210/447 |
| 4,678,589 | 7/1987 | Ayres, Jr. | 210/447 |
| 4,783,266 | 11/1988 | Titch et al. | 210/435 |
| 4,961,847 | 10/1990 | Amr . | |
| 5,139,673 | 8/1992 | Martin | 55/503 |
| 5,213,596 | 5/1993 | Kume et al. . | |
| 5,229,078 | 7/1993 | Haerle . | |
| 5,269,824 | 12/1993 | Takita . | |
| 5,632,793 | 5/1997 | Haggard . | |
| 5,704,957 | 1/1998 | Rutz . | |
| 5,862,667 | 1/1999 | Prince et al. | 210/448 |
| 5,944,991 | 8/1999 | Shellenbarger et al. | 55/502 |
| 5,951,728 | 9/1999 | Hopson | 55/503 |

FOREIGN PATENT DOCUMENTS

| | | |
|---|---|---|
| 604494 | 8/1960 | Canada . |
| 404136401 | 5/1992 | Japan . |
| 694-663 | 11/1979 | U.S.S.R. . |

*Primary Examiner*—Duane S. Smith

[57] ABSTRACT

A fuel filtering apparatus for use in a gas turbine fuel system is provided. The fuel filtering apparatus includes a removable filter housing which receives and maintains a filter element therein to filter a fuel flow when the filter housing is positioned on the apparatus. The fuel filtering apparatus is also provided with a casing which is installed in-line in a portion of the fuel system. The removable filter housing alleviates the need for removal of the casing when a filter element is inserted and removed for cleaning and other routine maintenance. The fuel filtering apparatus also reduces pressure disruption within the fuel system.

14 Claims, 2 Drawing Sheets

FUEL SYSTEM FILTERING APPARATUS

BACKGROUND OF THE INVENTION

1. Field of the Invention

The present invention generally relates to equipment employed in a fuel system. The present invention more specifically relates to an apparatus and associated method for filtering fuel in a fuel system, such as a gas turbine fuel system.

2. Description of the Prior Art

Apparatus and methods for filtering a variety of fluids and liquids have been known in the art.

U.S. Pat. No. 3,179,253 to McNeal discloses a strainer comprising a casing having a removable cover secured to the casing by bolts. This patent describes a strainer which is stated to be particularly useful for water supply systems for large industrial plants which draw directly from a river or other source of supply which may contain a considerable amount of rubbish such as sticks, leaves and other debris.

U.S. Pat. No. 5,213,596 to Kume et al. discloses an air cleaner device which includes a filter element for filtering air. The housing of this device has an inlet and outlet and a flow passage in communication with the inlet and the outlet.

U.S. Pat. No. 5,632,793 to Haggard discloses a filter assembly stated to be formed of an impervious elongated tubular housing with an elongated filter member positioned within the housing. This patent describes air flowing into the housing inlet and through the filter member before exiting at the outlet end.

U.S. Pat. No. 2,893,563 to Bottum discloses a strainer construction including a tube, a cone-shaped screen, and a coil-shaped mounted spring. This patent states that assembly of the spring and screen into the body of its tube generally requires the use of a hand tool.

U.S. Pat. No. 4,961,847 to Amr discloses a suction strainer for use with a fluid machine. This patent discloses a suction strainer assembly comprising a housing which includes a tee-shaped structure having an inlet and outlet and a single strainer apparatus.

Canadian Patent 604,494 is described as a filter and more particularly to a dry type gas filter. The filter unit of this patent comprises a housing formed of a cylindrical casing having air inlet and outlet apparatus, and a removable cover member seated over the filter element enclosed in the housing.

U.S. Pat. No. 5,229,078 to Haerle discloses a filter for the separation of impurities or contaminants from a fluid or gas use medium. This patent also discloses a filter body having a plurality of inlet and outlet channels, whereby the inlet channels are separated from the outlet channels by filter walls which form reaction spaces.

U.S. Pat. No. 5,269,824 to Takita discloses a generally flat air filter device for an optical disc drive. This patent discloses a filter including a filter mat which removes dust and other impurities from the air and which has a generally "V" shaped section.

U.S. Pat. No. 5,704,957 to Rutz discloses a powder barrier with a filter element of microporous material for use with an air injector in a powder feeder of a powder coating system.

U.S. Pat. No. 2,910,717 to Raymond discloses a vacuum cleaner hose attachment. This patent teaches attachment which is stated to be effective for pulsating a flow of air into the vacuum cleaner hose. An apparatus is also disclosed in this patent for straining the air entering the vacuum cleaner hose and providing a visual indication of the operation of the attachment.

What is needed, however, is an apparatus which will provide an in-line installation of a filter which is insertable and removable without significant disruption of the fuel system in which it is employed, such as in a gas turbine. An apparatus is needed which has the potential for high temperature applications, and which does not provide significant resistance or back pressure to fuel flow in the fuel system. Furthermore, what is also needed is a fuel filter apparatus which provides for accessible, manual removal of a filter element from the filtering apparatus without also requiring removal of the housing of the filtering apparatus from the fuel system.

As a result, in spite of existing fluid and liquid filtering technology, there remains a real and substantial need for a fuel system filtering apparatus which will minimize the problems associated with conventional fuel filter design and its resultant functionality.

SUMMARY OF THE INVENTION

The present invention provides a fuel filtering apparatus particularly suitable for use in a gas turbine fuel system. The fuel filtering apparatus comprises a casing having a chamber of a selected volume and an inlet and an outlet in communication with the chamber. A lateral opening is also formed in communication with the chamber to permit installation or removal of a filter housing on the casing. The filter housing is provided with a cover portion and a filter receiving portion. When placed in position, the filter receiving portion of the filter housing seats within the chamber. The filter receiving portion also has a transverse passageway extending therethrough which is suitable to receive a filter element. The filter element is secured in the transverse passageway and has both an inlet and outlet.

A sealing apparatus is positioned between the casing and the filter housing and is provided for sealing the lateral opening and the chamber of the apparatus. Securing apparatus, such as through bolts, are also provided to secure the filter housing in its position covering the lateral opening of the chamber.

In another aspect of the present invention, the fuel filtering apparatus is employed in a gas turbine fuel system. A fuel filtering apparatus as previously described is included in the fuel system with its inlet connected to a first pipe portion to transport a fuel flow through the first pipe portion into the casing. A second pipe portion is connected to the casing outlet to transport the filtered fuel flow away from the casing and throughout other portions of the gas turbine fuel system.

It is an object of the present invention to provide in-line installation of a fuel filter in a fuel system to alleviate the need for removal of the entire casing from the fuel system when inserting or removing a filter element.

It is an object of the present invention to provide an apparatus with removable filter elements to reduce pressure disruption caused by the filtering apparatus in its operation within the fuel system.

It is an object of the present invention to reduce the potential for interruption of pressure levels within the fuel system by permitting alignment of inlet and outlet ends of a filtering apparatus casing.

It is an object of the present invention to provide a fuel filtering apparatus which may be readily manipulated by a user employing hand-held work tools and which does not require heavy duty equipment to remove a filter element from the filtering apparatus.

It is an object of the present invention to provide a fuel filtering apparatus having a structure which is capable of enduring high temperature applications in filtering a fuel flow.

These and other objects of the present invention will be more fully understood from the following description of the invention on reference to the illustrations appended hereto.

DESCRIPTION OF THE PREFERRED EMBODIMENTS

Figure 1:
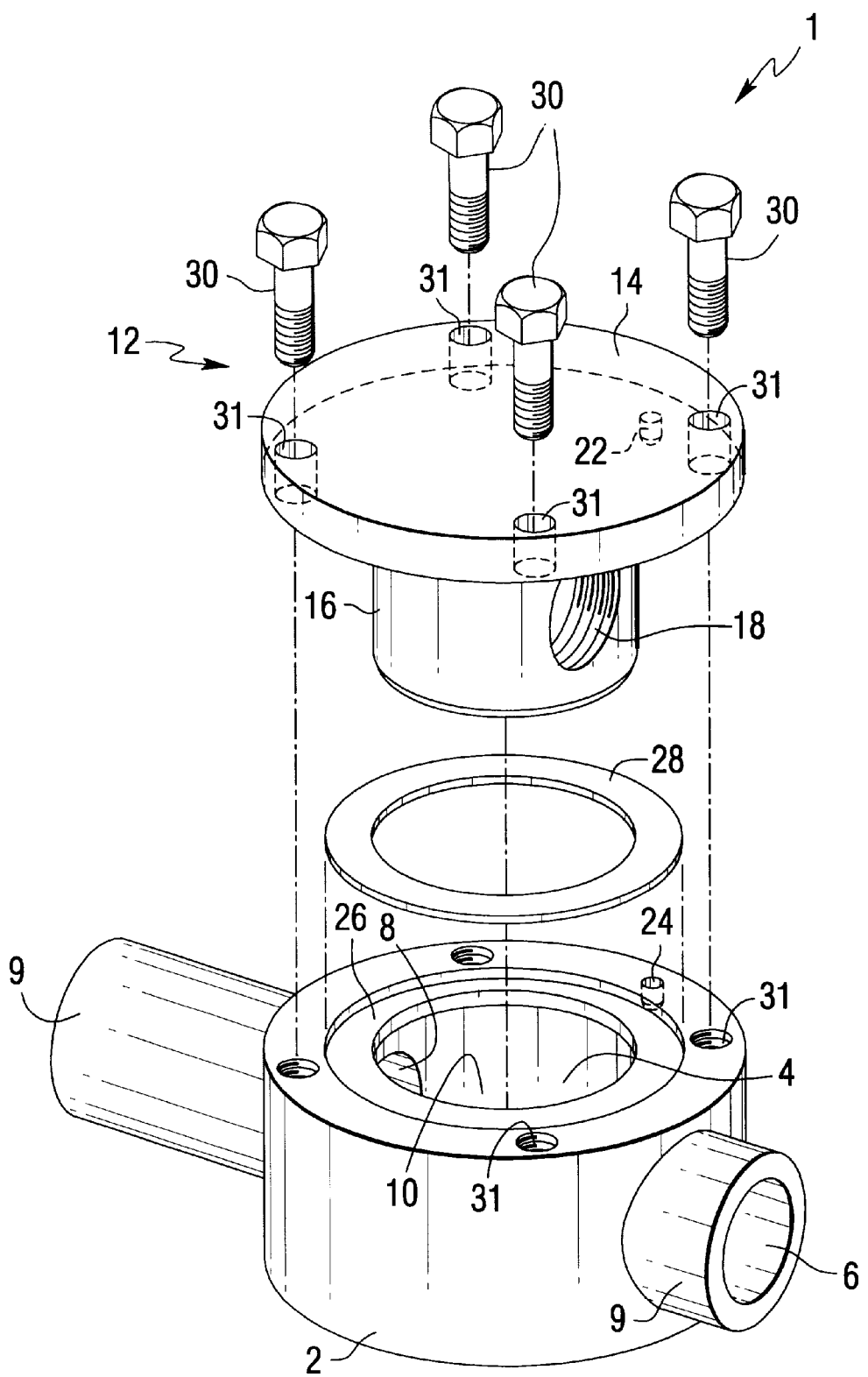
FIG. 1 is an exploded isometric view of the filtering apparatus of the present invention.

Referring now to FIG. 1, the fuel filtering apparatus 1 of the present invention includes a casing 2 having a chamber 4 disposed therein which is substantially cylindrical. An inlet 6 and an outlet 8 communicate with the chamber 4 and the inlet 6 and the outlet 8 are preferably in substantial axial alignment with respect to each other. Additionally, a lateral opening 10 communicates with the chamber 4. A filter housing 12, having a cover portion 14 and a filter receiving portion 16, may be seated within chamber 4. To facilitate an effective mechanical fit between the filter housing 12 and the chamber 4, the filter receiving portion 16 may be provided in a substantially cylindrical shape for complementarily and substantially filling the chamber 4.

Figure 2:
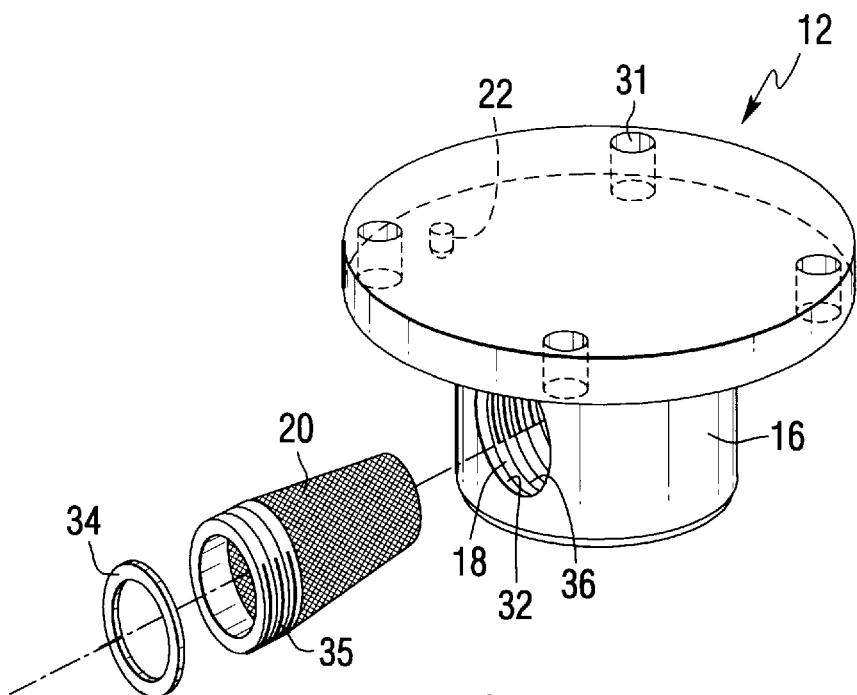
FIG. 2 is an exploded isometric view of the filter housing and filter element of the present invention; and, FIG. 3 is a top plan view of the filtering apparatus of the present invention with the filter housing removed.

Referring now to FIGS. 1 and 2, the filter receiving portion 16 has a transverse passageway 18 extending therethrough which is suitable to receive a filter element 20. The filter element 20 is preferably provided with an inlet and outlet which respectively substantially align with the inlet 6 and the outlet 8 of the casing 2 when the filter housing 12 is positioned on the casing 2. To provide this substantial inlet-inlet and outlet-outlet alignment, the filter housing 12 can be provided with a guide 22. The guide 22 may be embodied as a projection which is received into complementary guide hole 24 when the filter housing 12 is positioned in place over lateral opening 10. It will be appreciated that the filter housing can have the complementary guide hole and the casing can have the guide extending therefrom.

Referring again to FIG. 1, the casing 2 of the fuel filtering apparatus 1 has a shoulder recess 26 formed around the circumference of the lateral opening 10. The shoulder recess 26 is suited to receive a sealing ring 28 or another suitable gasket or sealing apparatus. The sealing ring 28 promotes sealing of the chamber 4 when the filter housing 12 is secured over the lateral opening 10 of the casing 2. The securement of the filter housing 12 to the casing 2 can be accomplished by a plurality of bolts 30 which are received into bolt holes 31 formed in the casing 2 and spaced apart around the circumference of the lateral opening 10. The cover portion 14 also has bolt holes 31 formed therein which cooperate and align with the bolt holes 31 in casing 2 when the filter housing 12 is positioned to cover the lateral opening 10.

Referring now to FIG. 2, the filter receiving portion 16 of the filter housing 12 is suited to receive the filter element 20 into the transverse passageway 18. A filter retaining ring 34 may be employed once the filter element 20 has been secured in the transverse passageway 18. The filter retaining ring 34 is positioned against an inner shoulder 32 of the transverse passageway 18 to resist potential movement and possible dislodgement of the filter element 20 when the filter housing 12 is installed. The filter element 20 is preferably provided with a threaded end 35 which engages threads 36 formed in the transverse passageway 18 when the filter element 20 is installed in the filter receiving portion 16 of the filter housing 12.

Referring again to FIG. 2, the filter element 20 is preferably provided in the shape of a cone. It will be appreciated that a cone-shaped filter element 20 is desirable for reducing fuel flow resistance during filtering operation and for facilitating removal of pollutants from the filter element 20.

Referring again to FIGS. 1 and 2, in operation, the fuel filtering apparatus 1 is installed in-line in a fuel system such as between pipe portions 9 as shown in FIG. 1. A user can manually position the filter housing 12 so that the filter element 20 can be threaded into the transverse passageway 18 of the filter housing 12 by the hand or hand tool of the user. Next, the sealing ring 28 is positioned on the shoulder recess 26 to further promote an adequate seal for fuel (not shown) passing through the chamber 4. The filter housing 12 is then placed over the lateral opening 10 of the casing 2, oriented such that guide 22 is aligned with and received into guide hole 24.

The guide 22 is preferably positioned in conjunction with guide hole 24 so that when filter housing 12 is placed on the casing 2, the bolt holes 31 in cover portion 14 will substantially align with the bolt holes 31 of casing 2. Similarly, the guide 22 or other conventional alignment structure is provided to ensure that the inlet and the outlet of the filter element 20 in transverse passageway 18 are substantially aligned respectively with the inlet 6 and the outlet 8 of the casing 2. Additionally, the inlet 6 is preferably substantially aligned with the outlet 8 during fuel filtering operation to reduce potential reduction or loss of the system pressure.

Referring again to FIGS. 1 and 2, with respect to the operation of the present invention, securement devices such as bolts 30, can be threaded and then threadedly received into the bolt holes 31 in casing 2. The bolts 30 serve to secure the filter housing 12 to the casing 2. The filter receiving portion 16 of the filter housing 12 preferably substantially fills the entire chamber 4 when the filter housing 12 is positioned over the lateral opening 10.

Figure 3:
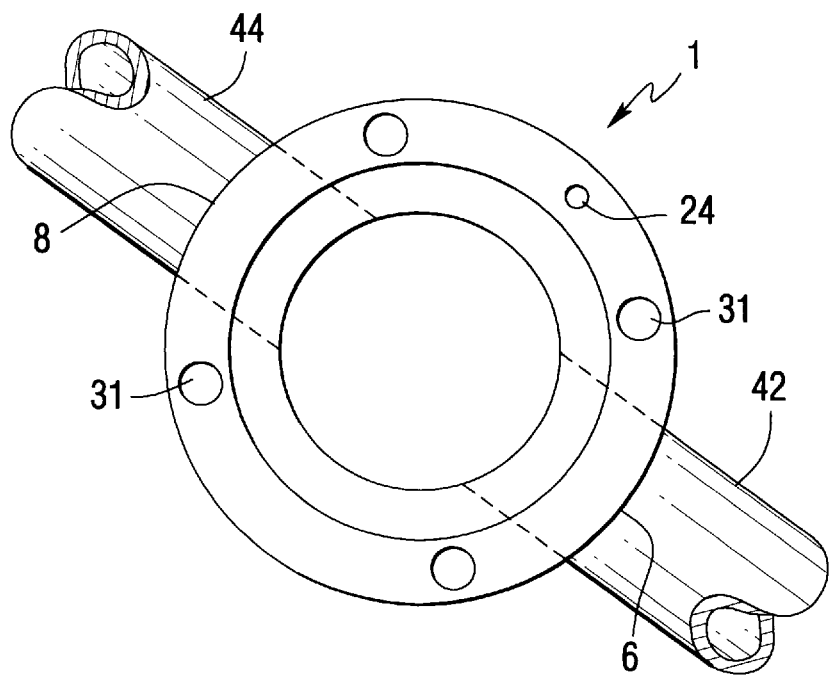

Referring now to FIG. 3, in a fuel system subassembly embodiment of the present invention, the fuel filtering apparatus 1 is employed with a first pipe portion 42 connected to the inlet 6 of the apparatus 1 and a second pipe portion 44 connected to the outlet 8 of the apparatus 1. This in-ine installation provides for an accessible fuel filter element (not shown) which may be readily installed into or removed from the apparatus 1. In addition, the in-line installation of apparatus 1 reduces the possibility that the entire apparatus 1 will need to be removed when filter elements are inserted into and removed from apparatus 1, such as for cleaning or other maintenance. This also reduces the number of fuel system components, such as couplings (not shown), which must be disassembled and removed to change a filter element employed in the apparatus 1.

Referring again to FIG. 3, the apparatus 1 has its inlet 6 and its outlet 8 each respectively attached to a pipe portion 42,44 such as by a conventional coupling (not shown) or by direct welding. It will be appreciated that welding of the pipe portions 42,44 to the apparatus 1 results in a filtering operation which has greater resistance to leaks and other disruptions in fuel flow. In operation, the first pipe portion 42 transports an unfiltered fuel flow to the inlet 6 of the apparatus 1. The second pipe portion 44 transports the filtered fuel flow from the outlet 8 of the apparatus 1 to other parts of the fuel system in which the apparatus 1 is installed.

Whereas particular embodiments of the invention have been described for purposes of illustration, it will be evident to those skilled in the art that variations of the details may be made without departure from the invention as defined in the appended claims.

What is claimed is:

1. A fuel filtering apparatus for use in a gas turbine fuel system characterized by:

a casing having a chamber and an inlet, an outlet, and a lateral opening in communication with said chamber;

a filter housing, covering said chamber, having a transverse passageway extending therethrough;

a filter element secured in said transverse passageway;

sealing means, positioned between said filter housing and said chamber, for sealing said chamber; and, securing means for covering said lateral opening of said chamber with said filter housing.

2. The apparatus of claim 1, further characterized in that said filter housing includes a cover portion and a filter receiving portion seated within said chamber, and wherein said transverse passageway extends through said filter receiving portion.

3. The apparatus of claim 2, further characterized in that said filter receiving portion substantially fills said chamber.

4. The apparatus of claim 1, further characterized in that said chamber is generally cylindrical and said filter housing means is generally cylindrical in shape and complementary to said generally cylindrical chamber.

5. The apparatus of claim 1, further characterized in that an inlet and outlet of said filter element are respectively in substantial alignment with said casing inlet and outlet.

6. The apparatus of claim 5, further characterized by including a guide connected to either one of said filter housing or said casing which is received into a guide hole formed in the other of said filter housing or said casing to orient said filter housing with respect to said casing to provide said substantial alignment.

7. The apparatus of claim 1, further characterized in that said casing inlet is substantially axially aligned with said casing outlet.

8. The apparatus of claim 1, further characterized in that said casing further comprises a shoulder recess substantially surrounding said lateral opening.

9. The apparatus of claim 8, further characterized in that said sealing means comprises a sealing ring disposed in said shoulder recess.

10. The apparatus of claim 1, further characterized in that said securing means comprises a plurality of bolts which removably connect said filter housing to said casing.

11. The apparatus of claim 1, further characterized in that said transverse passageway has an inner shoulder upon which seats a filter retaining ring to resist movement of said filter element.

12. The apparatus of claim 1, further characterized in that said filter element is threadedly secured within said transverse passageway.

13. A gas turbine fuel subassembly characterized by an apparatus comprising:

a fuel filtering apparatus comprising a casing having a chamber and an inlet, an outlet, and a lateral opening in communication with said chamber, a filter housing removably seated within said chamber having a transverse passageway extending therethrough, a filter element secured in said transverse passageway, sealing means for sealing said chamber positioned between said casing and said filter housing, and securing means for covering said lateral opening of said chamber with said filter housing;

a first pipe portion connected to said casing inlet to transport a fuel flow to said casing; and, a second pipe portion connected to said casing outlet to transport said fuel flow away from said casing, whereby said filter housing is removable from said casing without disconnecting said casing from said first and second pipe portions.

14. The subassembly of claim 13, further characterized in that said first and second pipe portions respectively are welded to said casing inlet and outlet.

* * * * *